(12) United States Patent
Debras et al.

(10) Patent No.: US 6,200,920 B1
(45) Date of Patent: Mar. 13, 2001

(54) TITANATED CHROMIUM-BASED CATALYSTS TO PRODUCE POLYETHYLENE

(75) Inventors: Guy Debras, Frasnes Lez Gosselies; Jean-Pierre Dath, Beloeil, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/092,658

(22) Filed: Jun. 5, 1998

(30) Foreign Application Priority Data

Jun. 6, 1997 (EP) .................................................. 97109215

(51) Int. Cl.$^7$ .................................................... B01J 32/00
(52) U.S. Cl. .......................... 502/103; 502/232; 502/254; 502/256; 502/240; 502/242; 526/113; 526/96; 526/106; 526/348
(58) Field of Search .............................. 526/113, 96, 106, 526/348; 502/103, 232, 254, 240, 242, 256

(56) References Cited

U.S. PATENT DOCUMENTS

| | | | | |
|---|---|---|---|---|
| 4,184,979 | * | 1/1980 | Kirch et al. ........................... | 252/430 |
| 5,599,887 | * | 2/1997 | Badley et al. ....................... | 526/105 |

FOREIGN PATENT DOCUMENTS

| | | | | |
|---|---|---|---|---|
| 0314385 | 10/1988 | (EP) | ............................... | C08F/10/00 |
| 0352715 | 7/1989 | (EP) | ............................... | B01J/21/06 |
| 647661A | 10/1994 | (EP) | ............................... | C08F/10/02 |
| 661299A | 12/1994 | (EP) | ............................... | C08F/4/22 |
| 2132707 | 4/1972 | (FR) | ............................... | B01J/11/00 |
| 9533777 | 5/1995 | (WO) | ............................... | C08F/10/00 |

* cited by examiner

*Primary Examiner*—David W. Wu
*Assistant Examiner*—Ling-Siu Choi
(74) *Attorney, Agent, or Firm*—Jim D. Wheelington

(57) ABSTRACT

The present invention relates to a supported chromium-based catalyst titanated under specific conditions and used for the homopolymerization or the copolymerization of ethylene. The polyethylene obtained with this catalyst has high shear resirance and environmental stress crack resistance, and can be used for manufacturing films with improved tear properties.

6 Claims, No Drawings

TITANATED CHROMIUM-BASED CATALYSTS TO PRODUCE POLYETHYLENE

The present invention relates to a catalyst for producing a high density polyethylene having a broad molecular weight distribution, in order to obtain good processability and good physical and chemical properties. In particular, the good physical properties may be improved tear properties when the polyethylene is made into films and/or improved environmental stress crack resistance. The present invention further relates to a process for producing said catalyst and to the use of such a catalyst.

For polyethylene, and for high density polyethylene (HDPE) in particular, the molecular weight distribution (MWD) is a fundamental property which determines the properties of the polymer, and thus its applications. It is generally recognised in the art that the molecular weight distribution of a polyethylene resin can principally determine the physical, and in particular the mechanical, properties of the resin and that the provision of different molecular weight polyethylene molecules can significantly affect the rheological properties of the polyethylene as a whole.

The molecular weight distribution can be completely defined by means of a curve obtained by gel permeation chromatography. Generally, the molecular weight distribution (MWD) is more simply defined by a parameter, known as the dispersion index D, which is the ratio between the average molecular weight by weight (Mw) and the average molecular weight by number (Mn). The dispersion index constitutes a measure of the width of the molecular weight distribution. For most applications, the molecular dispersion index varies between 10 and 30.

Since an increase in the molecular weight normally improves the physical properties of polyethylene resins, there is a strong demand for polyethylene having high molecular weight. These high molecular weight molecules, however render the polymer more difficult to process. On the other hand, a broadening in the molecular weight distribution tends to improve the flow of the polymer when it is being processed at high shear rates. Accordingly, in applications requiring a rapid transformation of the material through a die, for example in blowing and extrusion techniques, the broadening of the molecular weight distribution permits an improvement in the processing of polyethylene at high molecular weight (high molecular weight polyethylenes have a low melt index, as is known in the art). It is known that when the polyethylene has a high molecular weight and also a broad molecular weight distribution, the processing of the polyethylene is made easier as a result of the low molecular weight portion while the high molecular weight portion contributes to a good impact resistance for the polyethylene resin. A polyethylene of this type may be processed using less energy with higher processing yields.

As a general rule, a polyethylene having a high density tends to have a high degree of stiffness. In general, however, the environment stress crack resistance (ESCR) of polyethylene has an inverse relationship with stiffness. In other words, as the stiffness of polyethylene is increased, the environment stress crack resistance decreases, and vice versa. This inverse relationship is known in the art as the ESCR-rigidity balance. It is required, for certain applications, to achieve a compromise between the environmental stress crack resistance and the rigidity of the polyethylene.

Polyethylene is well known in the art for use in making films. Typically, polyethylene films are blown or extruded through a die. The blowing and extrusion of the thin film defines for the film a machine direction in the direction of blowing or extrusion through the die and an orthogonal transverse direction. For many applications, the polyethylene film is required to have a high tear strength, and in particular a high isotropy in the tear strength between the machine and transverse directions. As a result of the blowing or extrusion technique, the polyethylene polymer chains can become substantially aligned in the machine direction of the blowing or extrusion process. This can yield a significantly higher tearing strength in the transverse direction of the film as compared to the tearing strength in the machine direction. There is generally a need for polyethylene films having good tear properties for use in the manufacture of films, and in particular a good isotropy in the tear properties between the machine and transverse directions.

A variety of catalyst systems are known for the manufacture of polyethylene. It is known in the art that the physical properties, in particular the mechanical properties, of a polyethylene resin can vary depending on what catalyst system was employed to make the polyethylene. This is because different catalyst systems tend to yield different molecular weight distributions in the polyethylene produced. Thus for example the properties of a polyethylene resin produced using a chromium-based catalyst (i.e. a catalyst known in the art as a "Phillips catalyst") tend to be different from the properties of a product employed using a Ziegler-Natta catalyst.

For the manufacture of polyethylene films, it is known that HDPE resins made using Ziegler-Natta catalysts have a good balance in their tear properties between the machine and transverse directions. In particular, such resins made using Ziegler-Natta catalysts, and having what is known in the art as a bimodal molecular weight distribution, have good isotropic tear properties. Such a bimodal HDPE resin has a bimodal distribution of the molecular weight of the high density polyethylene which is represented in a graph of the molecular weight distribution as determined for example by gel phase chromatography. The graph includes in the curve a "shoulder" on the high molecular weight side of the peak of the molecular weight distribution. Such a bimodal high density polyethylene consists of high and low molecular weight fractions in which the mixture of those fractions is adjusted as compared to a monomodal distribution so as to increase the proportion of high molecular weight species in the polymer.

The production of high density polyethylene using just a chromium-based catalyst is thus desirable to enable the particular polyethylene product to be manufactured. The Encyclopedia of Polymer Science and Engineering, Volume 6, pages 431–432 and 466–470 (John Wiley & Sons, Inc., 1986, ISBN 0-471-80050-3) and Ullman's Encyclopedia of Industrial Chemistry, Fifth Edition, Volume A21, pages 501–502 (VCH Verlagsgesellschaft mbH, 1992, ISBN 3-527-20121-1) each discuss Phillips and Ziegler-Natta catalysts and the production of HDPE.

It is known in the art that in order to obtain the advantages of a broad molecular weight distribution, it is necessary to polymerise an intimate mixture of polyethylene molecules prepared in a common manufacturing process. It is known in the art that it is not possible to prepare a polyethylene having a broad molecular weight distribution and the required properties simply by blending polyethylenes having different molecular weights.

It has thus been proposed to carry out the polymerisation by a two step process, using two reactors connected in series (GB-A-1233599; EP-A-057352; U.S. Pat. Nos. 4,414,369 and 4,338,424). In a first step and in the first reactor a fraction of the high density polyethylene is produced under specified conditions and in the following second step in the second reactor a second fraction of the high density polyethylene is produced using a different set of polymerisation conditions. In the two-step process, the process conditions and the catalyst can be optimised in order to provide a high efficiency and yield for each step in the overall process. The currently commercially employed two-step processes suffer from the disadvantage that because two separate serial processes are employed, the overall process has a low throughput.

It has further been proposed to produce polyethylene with a broad molecular weight distribution with a two-catalyst mixture of one supported chromium catalyst and one Ziegler-Natta type catalyst (EP-A-0480376). This process suffers from the disadvantage that the Ziegler-Natta catalyst requires a co-catalyst to give an active catalytic system but the co-catalyst can influence the supported chromium catalyst and in particular can detrimentally affect its activity.

It has also been proposed, for example in EP-A-661299, EP-A-647661 or WO 95/33777 to use chromium-based catalysts for the production of polyolefins.

There is a need in the art for a process for producing polyethylene resins suitable for blow molding having good environmental stress crack resistance (ESCR) and suitable for the manufacture of films having good tear properties, which do not use a Ziegler-Natta catalyst, and in particular which use a chromium-based catalyst.

It is known in the art to provide titanium in a chromium-based catalyst. Titanium can be incorporated either into the support for the chromium catalyst or into the catalytic composition deposited on the support.

Titanium can be incorporated into the support by coprecipitation or terprecipitation as is the case for cogel and tergel type catalysts developed by Phillips Petroleum described for example in EP-A-352715. Cogel and tergel catalysts respectively have binary and ternary supports. Alternatively, titanium can be incorporated into the support by impregnation of the support as described for example in U.S. Pat. No. 4,402,864 and FR-A-2,134,743 or by chemisorption of a titanium compound into the support as described for example in U.S. Pat. No. 4,016,343.

Titanation of the catalytic composition has been disclosed in earlier patent specifications.

U.S. Pat. No. 4,728,703 discloses that titanium can be incorporated into the catalytic composition by adding to a composite liquid suspension, of a carrier material (i.e. a support) and chromium trioxide, a titanium compound of the formula $Ti(OR)_4$.

U.S. Pat. No. 4,184,979 discloses that titanium can be incorporated into the catalytic composition by adding at elevated temperature a titanium compound such as titanium tetraisopropoxide to a chromium-based catalyst which has been heated in a dry inert gas. The titanated catalyst is then activated at elevated temperature.

The ethylene polymers obtained with all the above mentioned processes do not have satisfactory mechanical properties especially with regard to the environmental stress crack resistance (ESCR).

Therefore there exists a need for a chromium-based catalyst capable of producing polyethylene resins for blow molding, having good processability and good physical and chemical properties.

It is an aim of the present invention to provide a catalyst for the polymerisation of ethylene to produce polyethylene having good processability.

It is another aim of this invention to provide a catalyst for producing ethylene with high environmental stress crack resistance.

It is yet another aim of the present invention to provide a process for producing polyethylene using a chromium-based catalyst, with the resultant polyethylene resin being suitable for the manufacture of polyethylene films and in particular wherein the films have a good balance in their tear properties between the machine and transverse directions.

It is a further aim of the present invention to provide a catalyst for producing polyethylene having the above described desired properties, said catalyst having a high activity.

These and other aims can be achieved with a supported titanated chromium-based catalyst prepared under specific conditions, said catalyst being used for the production of high density polyethylene with improved processability and physical and chemical properties.

The present invention provides a process for preparing a titanated chromium-based catalyst for the production of high density polyethylene, by polymerising ethylene, or copolymerising ethylene and an alpha-olefinic comonomer comprising 3 to 10 carbon atoms, which comprises the steps of;
a) providing a silica-containing support having a specific surface area of at least 400 $m^2/g$;
b) depositing a chromium compound on the support to form a chromium-based catalyst;
c) dehydrating the chromium-based catalyst to remove physically adsorbed water by heating the catalyst at a temperature of at least 300° C. in an atmosphere of dry, inert gas;
d) titanating the chromium-based catalyst at a temperature of at least 300° C. in an atmosphere of dry, inert gas containing a titanium compound of the general formula selected from $R_n Ti(OR')_m$ and $(RO)_n Ti(OR')_m$ wherein R and R' are the same or different and are a hydrocarbyl group containing from 1 to 12 carbon atoms, n is 0 to 3, m is 1 to 4 and m+n equals 4, to form a titanated chromium-based catalyst having a titanium content of from 1 to 5% by weight, based on the weight of the titanated catalyst and
e) activating the titanated catalyst at a temperature of from 500 to 900° C.

The present invention further provides a catalyst for the production of high density polyethylene, by polymerising ethylene, or copolymerising ethylene and an alpha-olefinic comonomer comprising 3 to 10 carbon atoms, the catalyst comprising a silica-containing support having a specific surface area of at least 400 $m^2/g$, a chromium compound deposited on the support, and a titanium compound deposited on the support and comprising from 1 to 5% by weight Ti, based on the weight of the titanated catalyst.

The present invention also provides a process for producing polyethylene, in the presence of a chromium-based catalyst for the production of high density polyethylene, by polymerising ethylene, or copolymerising ethylene and an alpha-olefinic comonomer comprising 3 to 10 carbon atoms, the catalyst comprising a silica-containing support having a specific surface area of at least 400 $m^2/g$, a chromium compound deposited on the support, and a titanium compound deposited on the support and comprising from 1 to 5% by weight Ti, based on the weight of the titanated catalyst.

The present invention further provides the use of the catalyst of the invention in the production of high density polyethylene for providing a high environmental stress crack resistance and a low incidence of melt fracture when melted and subjected to rotational shear at varying speeds.

The present invention further provides the use, for increasing the isotropy of the tear properties of films made from polyethylene resins, of the catalyst system of the invention.

The present invention is predicated on the surprising discovery of the present inventor that, in the production of polyethylene resins, a particular chromium-based catalyst having a minimum specific surface area of a silica-containing support and which has been de-hydrated and the surface titanated prior to or during the process of the activation of the catalyst at elevated temperature, can unexpectedly yield high density polyethylene having a very high environmental stress crack resistance (ESCR) and a low melt fracture index and is able to improve the tear balance of a polyethylene film made from the polyethylene resin.

The silica-containing support material used in the catalyst of this invention can be any catalytic support known in the art. The support is an inorganic, solid, particulate porous material inert to the other components of the catalyst composition and to any other active components of the reaction system. Thus, suitable supports are inorganic materials, such as silica either alone or in combination with other metallic oxides, e.g., silica-alumina or silica-titania.

The support used in this invention has a large surface area of at least 400 $m^2/g$, preferably from 450 to 600 $m^2/g$ and more preferably from 475 to 550 $m^2/g$. The support preferably has a pore volume greater than 1 $cm^3/g$, more preferably from 1 to 3 $cm^3/g$, yet more preferably from 1.3 to 2.5 $cm^3/g$. It is preferred that the support be dried prior to any chromium species being deposited onto it.

Known chromium-containing compounds capable of reacting with the surface hydroxyl groups of the silica-containing supports can be utilised to deposit the chromium thereon. Examples of such compounds include chromium nitrate, chromium trioxide, chromate esters such as chromium acetate, chromium acetylacetonate and t-butyl chromate, silyl chromate esters and phosphorous-containing esters. Preferably, chromium trioxide is used.

A preferred chromium-based catalyst may comprise from 0.5 to 3% by weight of chromium, preferably about 1% by weight of chromium, on a catalyst support, such as a composite silica and titania support.

A particularly preferred chromium-based catalyst for use in the present invention comprises the catalyst "catalyst 1", having a surface area of 450 $m^2/g$, a pore volume of around 1.5 cc/g and a chromium content of around 1 weight % based on the weight of the chromium-containing catalyst. The support comprises a silica support. Other preferred silica-supported catalysts have a specific surface area of 500 $m^2/g$ and respective pore volumes of 2 and 3 cc/g. Another preferred catalyst with a silica support has a specific surface area of 450 $m^2/g$ and a pore volume of 1.5 cc/g.

The support is dried by heating or pre-drying of the support with an inert gas prior to use thereof in the catalyst synthesis, in the manner known to those skilled in the art, e.g. at about 200° C. for from 8 to 16 hours.

The chromium-based catalyst can be prepared by dry mixing or non-aqueous impregnation but is preferably prepared by impregnation of silica with an aqueous solution of a soluble chromium compound such as $CrO_3$.

The supported chromium-based catalyst is subjected to a pretreatment in order to dehydrate it by driving off physically adsorbed water from the silica or silica-containing support i.e. chemically adsorbed water in the form of hydroxide (—OH) groups bonded to the —Si—O— framework of the support need not be removed. The removal of physically adsorbed water avoids the formation of $TiO_2$ as a product from the reaction of water with the titanium compound subsequently introduced during the titanation procedure, as described below. The dehydration step is preferably carried out by heating the catalyst to a temperature of at least 300° C. in a fluidised bed and in a dry inert atmosphere of, for example, nitrogen. The dehydration step is preferably carried out for 0.5 to 2 hours.

In a next step, the supported chromium-based catalyst is loaded with a titanium compound. The titanium compound may be of the formula $R_n Ti(OR')_m$ or $(RO)_n Ti(OR')_m$ where R and R' are the same or different and can be any hydrocarbyl group containing 1 to 12 carbon atoms, n is 0 to 3, m is 1 to 4 and m+n equals 4. Preferably, the titanium compound is a titanium tetraalkoxide $Ti(OR')_4$ where R' can be an alkyl or a cycloalkyl group each having from 3 to 5 carbon atoms. The titanation is performed by progressively introducing the titanium compound into the stream of dry, inert non-oxidising gas described hereabove in the dehydration step. In the titanation step, the temperature is, as for the dehydration step, maintained at at least 300° C. Preferably, the titanium compound is pumped as a liquid into the reaction zone where it vaporises. This titanation step is controlled so that the titanium content of the resultant catalyst is from 1 to 5% by weight, and preferably from 2 to 4% by weight, based on the weight of the titanated chromium-based catalyst. The total amount of titanium compound introduced into the gas stream is calculated in order to obtain the required titanium content in the resultant catalyst and the progressive flow rate of the titanium is adjusted in order to provide a titanation reaction period of 0.5 to 1 hour.

After the introduction of the titanium compound has been terminated at the end of the reaction period, the catalyst is flushed under the gas stream for a period of typically 0.75 hours.

The dehydration and titanation steps are performed in the vapour phase in a fluidised bed.

The titanated catalyst is then subjected to an activation step in dry air at an elevated activation temperature for at least 6 hours. The activation temperature preferably ranges from 500 to 900° C., and is most particularly around 650° C. Improved ESCR is obtained when the activation temperature is around 650° C. The atmosphere is progressively changed from nitrogen to air, and the temperature is progressively increased, from the titanation step to the activation step.

The resultant titanated chromium-based catalyst has a very high activity.

In the preferred polymerisation process of the present invention, the polymerisation or copolymerisation process is carried out in the liquid phase, the liquid comprising ethylene, and where required an alpha-olefinic comonomer comprising from 3 to 10 carbon atoms, in an inert diluent. The comonomer may be selected from 1-butene, 1-hexene, 4-methyl 1-pentene, 1-heptene and 1-octene. The inert diluent is preferably isobutane. The polymerisation process is typically carried out at a polymerisation temperature of from 85 to 110° C. and at a pressure of from 20 to 45 bars. Preferably, the temperature ranges from 95 to 105° C. and the pressure from 40 to 42 bars to produce polymer resins of high ESCR. Preferably, the temperature ranges from 90 to 94° C. and the pressure is at a minimum of about 24 bars to produce films with improved tear properties.

Typically, in the polymerisation process the ethylene monomer comprises from 0.5 to 8% by weight, typically around 6% by weight, of the total weight of the liquid phase. Typically, in the copolymerisation process the ethylene monomer comprises from 0.5 to 8% by weight and the comonomer comprises from 0 to 4% by weight, each based on the total weight of the liquid phase.

A chemical reducing agent, such as a metal alkyl, may be introduced into the polymerisation reaction. The metal alkyl may comprise triethyl aluminium (TEAl) in an amount of around 0.5 ppm by weight based on the weight of the inert diluent. This can be used when lower activation temperatures for the catalyst have been employed.

Whilst the operating conditions, such as the temperature and pressure of polymerization in the reactor, and the catalyst's preparation conditions, such as the surface area of the support, obviously have an influence on the properties of the polymer, titanation of the catalyst under the specific conditions described above improves the ESCR, all other factors being substantially equal.

The titanated chromium-based catalyst is introduced into the polymerisation reactor. The alkylene monomer, and comonomer if present, are fed into the polymerisation reactor. In the preferred process of the present invention, the polymerisation or copolymerisation process is carried out in a liquid-full loop reactor; after a residence time in the reactor of 0.5 to 2 hours, and preferably of about one hour, the polyethylene is recovered and transferred to one or more settling legs where the concentration in solids is increased by gravity. The solid content in a loop reactor is typically 30 to 40% by weight; the concentration in a settling leg can be up to 60% by weight. The polymerisation product of high density polyethylene is discharged from the settling legs and separated from the diluent which can then be recycled.

The polyethylene obtained with the catalyst of this invention has a broad molecular weight distribution (MWD) which is represented by the dispersion index D of typically from 12 to 23 and a high density typically from 0.948 to 0.960 g/cm$^3$.

It is surprisingly observed that the polyethylene obtained with the catalyst of this invention has much higher environmental stress crack resistance (ESCR) and a much lower melt index than those obtained using the processes and catalysts of the prior art as summarised above, while keeping similar melt indices and densities. The polyethylene obtained in accordance with the invention also has a very high shear resistance (SR) defined as HLMI/MI2 where HLMI is the high load melt index measured at 190° C. and under a load of 21.6 kg and MI2 is the melt index measured at 190° C. under a load of 2.16 kg, both with the ASTM D-1238 standard method. The high shear resistance can result in suppression of the melt fracture phenomenon.

The following Examples are given to illustrate the invention without limiting its scope.

EXAMPLES 1 TO 7

These Examples illustrate polyethylene with better ESCR.

A silica support was impregnated with 1 wt% chromium by the following steps. 60 g of silica were dried by heating for one hour at 130° C., and then for 3 hours at 500° C. The silica was allowed to cool for 45 minutes in a desiccator. 50 g of the dried silica were placed under vacuum for 30 minutes. A solution was prepared by dissolving 3.498 g of chromium acetylacetonate in 250 ml of acetone. The solution was added to the dried silica drop by drop until the silica was completely saturated. Then the rest of the solution was added in a slow continuous stream. The saturated silica was agitated for 2 hours, then left overnight. The acetone was evaporated off at a temperature of 70° C. and under a pressure decreasing from 400 to 200 mbars until a fine, dry powder was obtained. The catalyst was then completely dried in an oven at 110° C. overnight.

This chromium-treated support was then introduced into an activator vessel incorporating a fluidised bed, flushed under nitrogen and the temperature was raised from room temperature to 300° C. The dehydration step was then carried out at this elevated temperature for 2 hours. After the dehydration step, titanium tetraisopropoxide, stored under anhydrous nitrogen, was progressively injected in the bottom of the activator vessel incorporating the fluidised bed. The amount of titanium tetraisopropoxide injected was calculated in order to give the required titanium content in the resultant catalyst and the flow thereof was adjusted in order to continue the injection to complete the desired level of titanation in around 30 minutes. After the injection was completed, the catalyst was flushed under nitrogen for around 45 minutes. Nitrogen was then progressively switched to air and the temperature was raised to the activation temperature of around 650° C. for the susequent activation step. In the activation step, the titanated chromium-based catalyst was maintained at the activation temperature for 6 hours. At the end of the activation step, the temperature was progressively decreased to 350° C. At continued cooling from 350° C. to room temperature, the catalyst was flushed under nitrogen.

EXAMPLE 8

The polymerisation of ethylene was carried out using the same procedure as in Examples 1 to 7 but the dehydration and titanation temperatures were both 400° C.

Table I specifies for each of Examples 1 to 8, the nature and the specific surface area of the support, the titanium weight percent, and the dehydration, titanation and activation temperatures.

The polymerization of ethylene was carried out in one liquid-full loop reactor in accordance with the polymerization process described above and in the presence of the catalyst of each Example prepared under the conditions specified above.

The polymerisation conditions for each of Examples 1 to 8 are also specified in Table I. In Example 7, a cocatalyst TEAL (triethyaluminium) was employed in the polymerisation process in the amount specified in Table I.

For each of Examples 1 to 8 the pressure was 42 bars; the diluent was isobutane and the comonomer was 1-hexene.

The weight percent of ethylene and 1-hexene are given in Table I.

The resulting melt index MI2, shear resistance SR, density, molecular weight distribution as represented by the dispersion index D, ESCR and melt fracture are also given in Table I. The melt indices were measured with the ASTM D-1238 method at a temperature of 190° C. and under a load of 2.16 kg for MI2 and 21.6 kg for HLMI. The ESCR values referred to herein are the Bell ESCR F50 values as determined in accordance with ASTM D-1693–70, Procedure B.

All the Examples shown in Table I have a surface area of the support larger than 450 m$^2$/g, are dehydrated and susequently titanated at an elevated temperature and are activated at a temperature of about 650° C. All the resultant polyethylenes exhibit simultaneously the desired properties of high stress crack resistance ESCR and low incidence of melt fracture when melted and subjected to rotational shear at varying speeds. Examples 3 to 7 for which results are available at rotational speeds of 20, 40 and 60 rotations per minute showed no fracture.

COMPARATIVE EXAMPLES 1 AND 2

The polymerization of ethylene was carried out using the same procedure as in Examples 1 to 7 but the catalyst was not titanated.

COMPARATIVE EXAMPLES 3 TO 5

The polymerization of ethylene was carried out using the same procedure as in Examples 1 to 7 but the catalyst's titanation was obtained by impregnation as described in U.S. Pat. No. 4,402,864 and triethylaluminum was used as a cocatalyst.

COMPARATIVE EXAMPLES 6 AND 7

The polymerization of ethylene was carried out using the same procedure as in Examples 1 to 7 but the chromium catalyst was not titanated and triethylaluminum was used as a cocatalyst. The surface area of the catalyst was only 316 $m^2/g$ for each of these Comparative Examples.

COMPARATIVE EXAMPLE 8

The polymerization of ethylene was carried out using the same procedure as in Examples 1 to 7 but the catalyst's support had a small surface area (308 $m^2/g$) and contained titania. The catalyst was not titanated. Triethylaluminum was used as a cocatalyst.

COMPARATIVE EXAMPLE 9

The polymerization of ethylene was carried out using the same procedure as in Examples 1 to 7 but the catalyst's support had a small surface area (280 $m^2/g$), the chromium-based catalyst was not titanated, and triethylaluminum was used as a cocatalyst.

Tables II specifies for each of Comparative Examples 1 to 9, the same information as for Examples 1 to 8.

In Comparative Examples 1 and 2, the surface area is large (492 $m^2/g$) but there is no titanation; the ESCR is high but at a rotational speed of 60 rotations per minute, melt fracure occured in four tests in Comparative Example 1 and in three tests in Comparative Example 2. No melt fracture occured at rotational speeds of 20 and 40 rotations per minute.

In Comparative Examples 3 to 5 and 8 where the titanium is in the support, the ESCR is very low.

In Comparative Examples 6, 7 and 9 where there is no titanium, the ESCR is very low.

TABLE I

|  | Example 1 | Example 2 | Example 3 | Example 4 | Example 5 | Example 6 | Example 7 | Example 8 |
|---|---|---|---|---|---|---|---|---|
| Support | Silica | Silica | Silica | Silica | Silica | Silica | Silica | Silica |
| Surface area $m^2/g$ | 458 | 458 | 484 | 484 | 484 | 484 | 484 | 467 |
| % Titanium by weight | 2.3 | 2.3 | 4 | 4 | 4 | 4 | 4 | 4 |
| Dehydration temperature (° C.) | 300 | 300 | 300 | 300 | 300 | 300 | 300 | 400 |
| Titanation temperature (° C.) | 300 | 300 | 300 | 300 | 300 | 300 | 300 | 400 |
| Activation temperature (° C.) | 650 | 650 | 650 | 650 | 650 | 650 | 650 | 650 |
| Polymerisation conditions |  |  |  |  |  |  |  |  |
| Temperature (° C.) | 106 | 105 | 104 | 102 | 102 | 102 | 102 | 102 |
| TEAL (ppm) | 0 | 0 | 0 | 0 | 0 | 0 | 1 | 0 |
| Ethylene (wt %) | 5 | 4.9 | 5.3 | 5.2 | 6 | 5.1 | 5.1 | 5.9 |
| 1-hexene (wt %) | 0.08 | 0.17 | 0.24 | 0.15 | 0.17 | 0.29 | 0.25 | 0.11 |
| Hydrogen (mole %) | 0.17 | 0.17 | 0.09 | 0.09 | 0.09 | 0.09 | 0.04 | 0.11 |
| Properties of polyethylene |  |  |  |  |  |  |  |  |
| MI2 (g/10') | 0.28 | 0.17 | 0.31 | 0.285 | 0.27 | 0.31 | 0.27 | 0.23 |
| Shear response SR | 84 | 96 | 86 | 101 | 96 | 85 | 97 | 106 |
| Density (g/$cm^3$) | 0.9581 | 0.9548 | 0.9544 | 0.9582 | 0.9581 | 0.952 | 0.952 | 0.958 |
| Dispersion index D | 13.6 | 14.9 | 13.2 | 13.6 | 13.8 | 15.2 | 15.7 | 14 |
| Bell ESCR F50 (hrs) 100% Antarox | 63 | 179 | 175 | 76 | 76 | 169 | 153 | 61 |
| Melt fracture |  |  |  |  |  |  |  |  |
| 20 rpm | n.a. | n.a. | 0 | 0 | 0 | 0 | 0 | n.a. |
| 40 rpm | n.a. | n.a. | 0 | 0 | 0 | 0 | 0 | n.a. |
| 60 rpm | n.a. | n.a. | 0 | 0 | 0 | 0 | 0 | n.a | n.a.: not available

TABLE II

| Comparative examples | Example 1 | Example 2 | Example 3 | Example 4 | Example 5 | Example 6 | Example 7 | Example 8 | Example 9 |
|---|---|---|---|---|---|---|---|---|---|
| Support | Silica | Silica | Silica titan. by impregn. | Silica titan. by impregn. | Silica titan. by impregn. | Silica | Silica | Silica Titania | Silica-alum. phosphate |
| Surface area $m^2/g$ | 492 | 492 | 490 | 490 | 490 | 316 | 316 | 308 | 280 |
| % Titanium by weight | 0 | 0 | 4 | 4 | 4 | 0 | 0 | 2 | 0 |
| Dehydration temperature (° C.) | — | — | — | — | — | — | — | — | — |
| Titanation temperature (° C.) | — | — | — | — | — | — | — | — | — |
| Activation temperature (° C.) | 650 | 650 | 650 | 650 | 650 | 600 | 700 | 650 | 650 |

TABLE II-continued

| Comparative examples | Example 1 | Example 2 | Example 3 | Example 4 | Example 5 | Example 6 | Example 7 | Example 8 | Example 9 |
|---|---|---|---|---|---|---|---|---|---|
| Polymerisation conditions | | | | | | | | | |
| Temperature (° C.) | 106 | 106 | 99 | 99 | 99 | 108 | 102 | 106 | 106 |
| TEAL (ppm) | 0 | 0 | 0.8 | 0.8 | 0.8 | 0.8 | 0.8 | 0.3 | 0.3 |
| Ethylene (wt %) | 4.5 | 3.9 | 4.1 | 3.7 | 4.4 | 4.9 | 5.2 | 4.9 | 4.7 |
| 1-hexene (wt %) | 0.06 | 0.1 | 0.11 | 0.16 | 0.22 | 0.03 | 0.07 | 0.09 | 0.1 |
| Hydrogen (mole %) | 0.47 | 0.77 | 0.09 | 0.09 | 0.09 | 0 | 0 | 0 | 0.9 |
| Properties of polyethylene | | | | | | | | | |
| MI2 (g/10') | 0.15 | 0.23 | 0.19 | 0.25 | 0.245 | 0.22 | 0.2 | 0.32 | 0.15 |
| Shear response SR | 90 | 82 | 123 | 114 | 116 | 82 | 109 | 78 | 126 |
| Density (g/cm$^3$) | 0.9566 | 0.9552 | 0.9558 | 0.9542 | 0.9511 | 0.9580 | 0.9587 | 0.9567 | 0.9573 |
| Dispersion index D | 11 | 9.8 | 13.8 | 13 | 13.2 | 11 | 9.2 | 10.2 | 11.7 |
| Bell ESCR F50 (hrs) 100% Antarox | 84 | 145 | 31 | 45 | 58 | 40 | <18 | n.a. | n.a. |
| Melt fracture | | | | | | | | | |
| 20 rpm | 0 | 0 | n.a. | n.a. | n.a. | n.a. | n.a. | n.a. | n.a. |
| 40 rpm | 0 | 0 | n.a. | n.a. | n.a. | n.a. | n.a. | n.a. | n.a. |
| 60 rpm | 4 | 3 | n.a | n.a. | n.a. | n.a. | n.a. | n.a. | n.a. | n.a.: not available

EXAMPLES 9 TO 12

These Examples illustrate the better tear properties of films made with the polyethylene of the invention.

In order to demonstrate the process of the present invention in which a dehydrated titanated and activated chromium-based catalyst was employed, a number of runs to copolymerise ethylene to form high density polyethylene were performed. In each of the Examples, a liquid comprising ethylene, 1-hexene and the balance isobutane as an inert diluent was fed into a polymerisation reaction zone. Hydrogen was also fed into the reaction zone. The temperature in the reaction zone ranged from 90 to 94° C. and the pressure ranged from 38 to 42 bars. In Example 12, a metal alkyl, in the form of triethyl aluminium (TEAl), was also introduced into the reaction zone as a reducing agent. Table III summarizes the processing conditions of Examples 9 to 12.

The catalyst system was also fed into the polymerisation reaction zone. In Examples 9 to 12, the chromium-based catalyst system comprised the catalyst identified as "catalyst 1" which had been activated at an activation temperature of around 650° C. The catalyst had been dehydrated and then titanated prior to activation by mixing the catalyst which a titanium-containing compound comprising titanium tetraisopropoxide. In Examples 9 to 12, the percentage of titanium present in the catalyst comprised from 2 to 4 weight % based on the weight of the catalyst system.

The dehydration, titanation and activation steps were carried out as follows. The chromium-based catalyst was then introduced into an activator vessel incorporated a fluidised bed, flushed under nitrogen and the temperature was raised from room temperature to 300° C. The dehydration step was then carried out at this elevated temperature for 2 hours. After the dehydration step, titanium tetraisopropoxide, stored under anhydrous nitrogen, was progressively injected into the bottom of the activator vessel incorporating the fluidised bed. The amount of titanium tetraisopropoxide injected was calculated in order to give the required titanium content in the resultant catalyst and the flow thereof was adjusted in order to continue the injection to complete the desired level of titanation in around 30 minutes. After the injection was completed, the catalyst was flushed under nitrogen for around 45 minutes. Nitrogen was then progressively switched to air and the temperature was raised to the activation temperature of around 650° C. for the subsequent activation step. In Example 12 a lower activation temperature of around 550° C. was employed and the reactivity of the polymerisation process was enhanced by the addition of TEAL to the reactants as specified in Table III. In the activation step, the titanated chromium-based catalyst was maintained at the activation temperature for 6 hours. At the end of the activation step, the temperature was progressively decreased to 350° C. At continued cooling from 350° C. to room temperature, the catalyst was flushed under nitrogen.

Table III also summarises the properties of pellets of the polyethylene resins produced in Examples 9 to 12 and also the properties of films of varying thickness produced from those polyethylene resins. For Examples 9 to 12, the high load melt index (HLMI) ranged from 11.8 to 15.1 g/10 min and the melt index MI$_2$ ranged from 0.07 to 0.086 g/10 min. The melt index MI$_2$ and the high load melt index HLMI were determined using the procedures of ASTM D 1238 using respective loads of 2.16 kg and 21.6 kg at a temperature of 190° C. The MI$_2$ and the HLMI are broadly inversely indicative of the molecular weight distribution of the polymer. The shear response for the polyethylene resins of Examples 9 to 12, being a ratio of the HLMI and the MI$_2$ values, ranged from 156 to 189. The density values for the polyethylene resins produced in accordance with Examples 9 to 12 are specified in Table III and range from 0.958 to 0.951 g/cc.

The polyethylene resins of Examples 9 to 12 were processed to produce films having a thickness of 10 microns, 20 microns and 40 microns. Table III shows the tear properties of those films. The tear strengths are expressed in N/mm. The tear strength in the machine direction (MD) and the tear strength in the transverse direction (TD) were measured using the procedures of ASTM D1922. For each of the films, the ratio between the TD and MD values was calculated and these are specified in Table III.

It will be seen from Table III that for each of the three film thicknesses employed in Examples 9 to 12 of 10, 20 and 40 microns, the TD/MD ratio is relatively low, being a maximum value of 5.7 for the 10 micron film of Example 9. This indicates a relatively good isotropy in the tear strength of the films. For example, it will be seen for 40 micron films of Examples 9 to 12 that the TDIMD ratio only ranges from a minimum value of 0.8 to a maximum value of 1.5, indicating a relatively high degree of isotropy in the tear strength in the machine and transverse directions.

COMPARATIVE EXAMPLE 10

In Comparative Example 10, the process of Examples 9 to 12 was repeated using the same chromium-based catalyst "catalyst 1" and using the same activation temperature of 650° C. and using the same processing conditions in the polymerisation process. However, in Comparative Example 10 the chromium-based catalyst was not subject to titanation prior to the activation step. The equivalent properties of the polyethylene resins produced in Comparative Example 10, and the properties of the films produced from those resins, are shown in Table III. It may be seen that the polyethylene resin produced in Comparative Example 10 has a significantly lower shear response of 96 as compared to the shear responses of the resins of Examples 9 to 12. This lower shear response value indicates reduced processability of the polyethylene resins. In addition, it may be seen that for each of the three film thicknesses of 10, 20 and 40 microns of Comparative Example 10, the TD/MD ratio is significantly higher for any given film thickness than for each of Examples 9 to 12. This demonstrates that the use of a titanated catalyst during activation significantly and unexpectedly improves the isotropy in the tear properties of a polyethylene film.

COMPARATIVE EXAMPLES 11 AND 12

Comparative Examples 11 and 12 demonstrate in Table III the typical properties of a polyethylene resin, and films having thickness of 20 and 40 microns produced therefrom, produced by a copolymerisation process using a Ziegler-Natta (Z-N) catalyst. It will be seen that the properties of the resins of Examples 9 to 12 are substantially similar to those of the resins produced using Ziegler-Natta catalysts. Moreover, it may be seen that the tear properties of the films, in particular the isotropy of the tear strength of the films in the machine and transverse directions, are substantially similar for the films of Examples 9 to 12 and as compared to those produced from the resins of Comparative Examples 11 and 12.

COMPARATIVE EXAMPLE 13

Comparative Example 13 demonstrates in Table III the typical properties of a polyethylene resin, and films having a thickness of 10,20 and 40 microns produced therefrom, produced by a copolymerisation process using a chromium-containing catalyst having a composite silica and titania support. In Comparative Example 13, the catalyst employed, "catalyst 2", had an average pore radius of 190 A, a pore volume of around 2.1 cc/g and a chromium content of around 1 wt % based on the weight of the chromium-containing catalyst. This catalyst contained 3 wt % titanium (in the titania in the support) based on the total weight of the catalyst. The catalyst was not subjected to a prior dehydration and titanation process before activation at around 550° C. It will be seen from Table III that for each of the film thicknesses employed the ratio of the tear strength in the transverse direction and the machine direction exhibited greater anisotropy than for the Examples in accordance with the invention.

Thus the present invention provides a process for making polyethylene resins which can be employed to produce films having good tear properties but with the process employing a chromium-based, as opposed to a Ziegler-Natta, catalyst.

TABLE III

| | EXAMPLES | | | | COMPARATIVE EXAMPLES | | | |
|---|---|---|---|---|---|---|---|---|
| | 9 | 10 | 11 | 12 | 10 | 11 | 12 | 13 |
| CATALYST | 1 | 1 | 1 | 1 | 1 | Z-N | Z-N | 2 |
| % Ti | 2 | 4 | 4 | 4 | 0 | — | — | 3 |
| ACTIVATION Temp (° C.) | 650 | 650 | 650 | 550 | 650 | — | — | 550 |
| PROCESS CONDITIONS | | | | | | | | |
| Temp (° C.) | 90 | 93 | 90 | 94 | 103 | — | — | 89 |
| Alkyl (TEA1) (ppm) | 0 | 0 | 0 | 0.5 | 0 | — | — | 0 |
| Ethylene (kg/h) | 9.4 | 9 | 9 | 10 | 9 | — | — | 9 |
| Hexene (cc/h) | 748 | 495 | 705 | 945 | 549 | — | — | 612 |
| Hydrogen (Nl/h) | 0 | 0 | 0 | 0 | 80 | — | — | 0 |
| Isobutane (kg/h) | 26 | 26 | 26 | 26 | 26 | — | — | 26 |
| PELLET PROPERTIES | | | | | | | | |
| HLMI (g/10') | 15.1 | 13.4 | 11.8 | 13.5 | 12.5 | 6.3 | 9.5 | 14.7 |
| MI2 (g/10') | 0.08 | 0.086 | 0.07 | 0.082 | 0.13 | 0.037 | 0.05 | — |
| SHEAR RESPONSE | 189 | 156 | 169 | 165 | 96 | 170 | 190 | 107 |
| DENSITY (g/cc) | .949 | .951 | .949 | .948 | .950 | .948 | .956 | .950 |
| FILM PROPERTIES | | | | | | | | |
| 10 μm | | | | | | | | |
| MD | 9 | 15 | 20 | 10 | 6.7 | — | — | 8 |
| TD | 51 | 25 | 26 | 41 | 116 | — | — | 136 |
| TD/MD ratio | 5.7 | 1.7 | 1.3 | 4.1 | 17.3 | — | — | 17 |
| 20 μm | | | | | | | | |
| MD | 16 | 20 | 30 | 19 | 9.8 | 13 | 23 | 7 |
| TD | 50 | 30 | 36.2 | 50 | 90 | 52 | 43 | 136 |
| TD/MD ratio | 3.1 | 1.5 | 1.2 | 2.6 | 9.2 | 4 | 2 | 19.4 |
| 40 μm | | | | | | | | |
| MD | 23 | 30 | 38.9 | 29 | 7.6 | 22 | 19 | 16 |
| TD | 35 | 23.5 | 30.1 | 36 | 33 | 51 | 25 | 76 |
| TD/MD ratio | 1.5 | 0.8 | 0.8 | 1.2 | 4.3 | 2.5 | 1.2 | 4.8 |

*Z-N = Ziegler-Natta

What is claimed is:

1. A process for preparing a supported chromium-based catalyst for the production of high density polyethylene, by polymerizing ethylene, or copolymerizing ethylene and an alpha-olefinic comonomer comprising 3 to 10 carbon atoms, which comprises the steps of:
   a) providing a support consisting essentially of silica having a specific surface area of at least 400 m$^2$/g;
   b) depositing a chromium compound on the support to form a chromium-based catalyst;
   c) dehydrating the chromium-based catalyst to remove physically adsorbed water by heating the catalyst at a temperature of at least 300° C. in an atmosphere of dry, inert gas;
   d) titanating the chromium-based catalyst at temperature of at least 300° C. in an atmosphere of dry, inert gas containing a titanium compound of the general formula selected from $R_n Ti(OR')_m$ and $(RO)_n Ti(OR')_m$ wherein R and R' are the same or different and are a hydrocarbyl group containing from 1 to 12 carbon atoms, n is 0 to 3, m is 1 to 4 and m+n equals 4, to form a titanated chromium-based catalyst having a titanium content of from 1 to 5% by weight, based on the weight of the titanated catalyst and e) activating the titanated catalyst at a temperature of from 500 to 900° C.

2. A process according to claim 1 wherein the support has a specifice surface area of from 450 to 600 m$^2$/g.

3. A process according to claim 2 wherein the support has a specific surface area of from 475 to 550 m$^2$/g.

4. A process according to claim 1 wherein the titanium compound is a tetraalkoxide of titanium having the general formula Ti(OR')$_4$ wherein R' is selected from an alkyl and a cycloalkyl each having from 3 to 5 carbon atoms.

5. A process according to claim 1 wherein the titanium content of the titanated catalyst is from 2 to 4% by weight Ti, based on the weight of the titanated catalyst.

6. A process according to claim 1 wherein the chromium compound is chromium oxide and the chromium content ranges from 0.5 to 1.5% by weight, based on the weight of the chromium-based catalyst prior to titanation.

* * * * *